United States Patent
Tucker et al.

(10) Patent No.: US 12,092,719 B2
(45) Date of Patent: Sep. 17, 2024

(54) HARMONIC WIRELESS SIGNAL CAPTURE TO MAP A STRUCTURAL ENVIRONMENT

(71) Applicant: T-MOBILE USA, INC., Bellevue, WA (US)

(72) Inventors: Wilfred I. Tucker, Centennial, CO (US); Jeremy Nuss, Englewood, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 399 days.

(21) Appl. No.: 17/388,443

(22) Filed: Jul. 29, 2021

(65) Prior Publication Data

US 2023/0036560 A1 Feb. 2, 2023

(51) Int. Cl.
| | | |
|---|---|---|
| *G01S 13/00* | (2006.01) | |
| *G01S 7/00* | (2006.01) | |
| *G01S 13/04* | (2006.01) | |
| *G01S 13/89* | (2006.01) | |
| *G01S 5/02* | (2010.01) | |

(52) U.S. Cl.
CPC ............ *G01S 13/003* (2013.01); *G01S 7/006* (2013.01); *G01S 13/04* (2013.01); *G01S 13/89* (2013.01); *G01S 5/0269* (2020.05)

(58) Field of Classification Search
CPC ........ G01S 13/003; G01S 7/006; G01S 13/04; G01S 13/878; G01S 13/06; G01S 13/89; G01S 5/0269
See application file for complete search history.

(56) References Cited

U.S. PATENT DOCUMENTS

| | | | |
|---|---|---|---|
| 2016/0124071 A1* | 5/2016 | Baxley | H04W 4/70 348/143 |
| 2017/0212210 A1* | 7/2017 | Chen | G01S 5/06 |
| 2018/0035263 A1* | 2/2018 | Titus | G01S 5/02585 |
| 2020/0191943 A1* | 6/2020 | Wu | G01S 13/726 |
| 2020/0371220 A1* | 11/2020 | Eitan | G01S 13/46 |
| 2021/0208272 A1* | 7/2021 | Lavian | H03L 7/091 |
| 2022/0043108 A1* | 2/2022 | Lavian | G01S 7/032 |

* cited by examiner

*Primary Examiner* — Vladimir Magloire
*Assistant Examiner* — Noah Yi Min Zhu
(74) *Attorney, Agent, or Firm* — Lee & Hayes, P.C.

(57) ABSTRACT

A system for radio-frequency imaging of a structural environment is disclosed, including radio devices configured to transmit radio signals and a radio imaging device configured to receive the radio signals transmitted by the radio devices. The radio signals received at some times are scattered, reflected, or attenuated by an object collocated with an active localization device. The radio signals received at other times are scattered, reflected, or attenuated by the object not collocated with the active localization device. The system can obtain an indication of a location of the active localization device and, based on the radio signals received at the times the object is collocated with the active localization device, generate a radio signature of the object associated with the location. The system can then compute a score indicative of a likelihood that the object is at the location when it is not collocated with the active localization device.

20 Claims, 5 Drawing Sheets

HARMONIC WIRELESS SIGNAL CAPTURE TO MAP A STRUCTURAL ENVIRONMENT

FIELD OF THE DISCLOSURE

The present disclosure generally relates to radio imaging and sensing, more particularly, to imaging a structural environment using wireless devices.

BACKGROUND

Continued developments in wireless technologies for personal area networks and local area networks enable applications beyond user-directed access to information via the internet. For example, devices compliant with a series of standards widely known as Wi-Fi, may enable a wide range of smart home applications. In some smart home applications, Wi-Fi devices may be in communicative connection with devices that use other technologies and standards (e.g., Bluetooth, Zigbee, etc.) to form heterogeneous networks. Networks that enable user-to-device and/or device-to-device communications, particularly when configured to use internet protocol (IP) may enable the so-called internet of things (IoT). Some smart home applications may become a matter of convenience for a user. For example, the smart networks may enable starting a coffee-maker or a garden sprinkler from an application (app) on a user device (e.g., a tablet, a smart phone, a smart watch, etc.). Another common set of applications may manage energy consumption, e.g. in a smart home or smart office setting. Still other applications may enable security devices by providing connectivity for wireless camera, door/window magnetic or vibrations sensors, and/or infrared motion detectors. The proliferation of wireless devices within the home provides an opportunity to enable new applications based on analyzing signal properties transmitted and/or received by the multiple wireless devices.

SUMMARY

In one embodiment, a system for radio-frequency imaging of a structural environment comprises one or more radio devices configured to transmit radio signals and a radio imaging device configured to receive, at a first time, the radio signals transmitted by the one or more radio devices, wherein the radio signals received at the first time are scattered, reflected, or attenuated by an object collocated with an active localization device. The radio imaging device is further configured to receive, at a second time, the radio signals transmitted by the one or more radio devices, wherein the radio signals received at the second time are scattered, reflected, or attenuated by the object not collocated with the active localization device. The system further comprises one or more processors configured to obtain an indication of a location of the active localization device at the first time and, based on the radio signals received at the first time and the indication of the location, generate a radio signature of the object associated with the location. The one or more processors are further configured to compute, based on the radio signals received at the second time and the generated radio signature, a score indicative of a likelihood that the object is at the location. Still further, the one or more processors are configured to compare the score to a threshold and to generate a notification that the object is at the location when the score is above the threshold.

In another embodiment, a method for radio-frequency imaging of a structural environment comprises transmitting, by one or more radio devices, radio signals and receiving, by a radio imaging device at a first time, the radio signals transmitted by the one or more radio devices, wherein the radio signals received at the first time are scattered, reflected, or attenuated by an object collocated with an active localization device. The method further comprises receiving, by the radio imaging device at a second time, the radio signals transmitted by the one or more radio devices, wherein the radio signals received at the second time are scattered, reflected, or attenuated by the object not collocated with the active localization device. Still further, the method comprises obtaining an indication of a location of the active localization device at the first time, and generating a radio signature of the object associated with the location based on the radio signals received at the first time and the indication of the location. Additionally, the method comprises: computing a score indicative of a likelihood that the object is at the location based on the radio signals received at the second time and the generated radio signature; comparing the score to a threshold; and generating a notification that the object is at the location when the score is above the threshold.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The present disclosure describes systems and methods for implementing situational awareness using wireless devices disposed within and/or around a structural environment. More specifically, the described systems and methods may enable radio-frequency imaging of a structural environment for detection, localization, and/or identification of static and dynamic objects. Additionally or alternatively, the described systems and methods may enable mapping the environment itself. Furthermore, the described systems and methods may be implemented using wireless devices that enable communicative connectivity within the structural environment.

The structural environment may include static elements (e.g., walls, floors, ceilings, etc.), semi-static elements (e.g., furniture, doors, etc.), and dynamic elements (e.g., people, animals). The elements of the structural environment may be referred to as objects. Electromagnetic signals transmitted by wireless devices disposed within or near the structural environment may be attenuated and/or scattered by the objects, enabling the described systems to image the environment using the methods described in the present disclosure. The electromagnetic signals may include radio-frequency (RF) signals or radio waves with suitable frequencies (e.g., 10 kHz to 50 GHz). In some implementations, the systems and methods may include use of terahertz or optical (e.g., infrared, visible, etc.) signals.

Figure 1A:
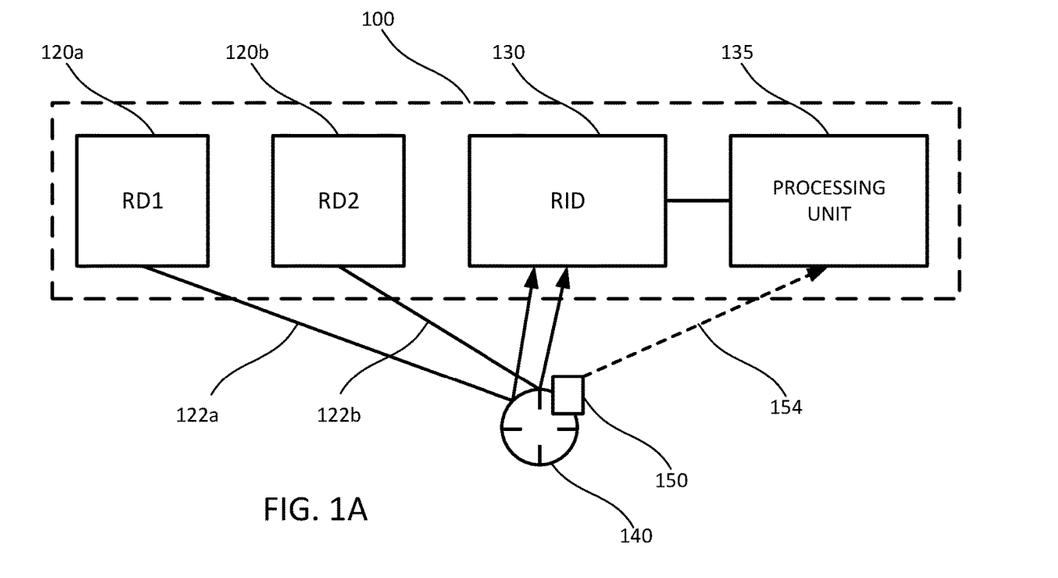
FIGS. 1A and 1B schematically illustrate a system for radio-frequency imaging and mapping of a structural environment.
Figure 1B:
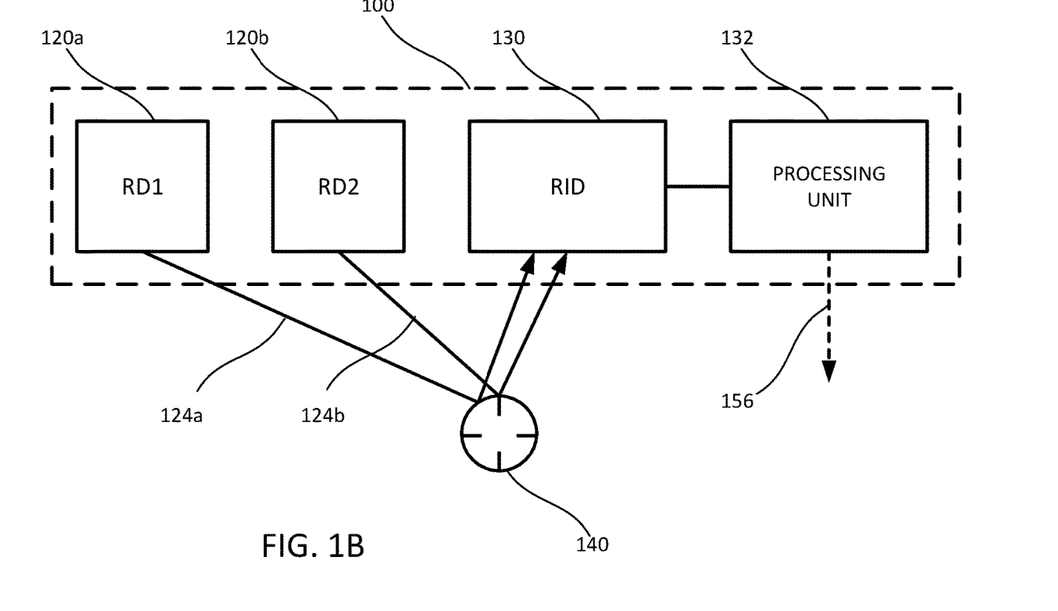

FIGS. 1A and 1B schematically illustrate a system 100 for RF imaging and/or mapping of a structural environment. The system 100 may include two radio devices 120a, b. In other implementations, the system 100 may include a single radio device or more than two (e.g., 3, 5, 10, 20, etc.) radio devices. The radio devices 120a, b are configured to emit electromagnetic radiation to transmit radio signals 122a, b and 124a, b. Generally, the radio signals transmitted by the radio devices 120a, b may be communication signals complying to one or more communication standards. In some implementations, the radio signals transmitted by the radio devices 120a, b may be signals configured for sensing including, for example, continuous wave (CW) signals.

More specifically, the radio devices 120a, b may include devices configured for establishing and supporting a wireless network throughout the structural environment. The radio devices 120a, b may conform to a standard that belongs to an Institute of Electrical and Electronics Engineers (IEEE) family of standards (e.g., IEEE 802.11) for Wireless Fidelity (Wi-Fi) networks. Additionally or alternatively, the radio devices 120a, b may be smart home, smart appliance, internet of things (IoT) and/or other computing and/or communication devices conforming to any suitable wireless standards (e.g., Bluetooth, Zigbee, etc.).

The electromagnetic radiation emitted by the radio devices 120a, b, averaged over a suitable time period (anywhere from a few tens of picoseconds to multiple milliseconds) may be substantially single-wavelength (single frequency) or may subtend a band of frequencies. The emitted electromagnetic radiation subtending a band of frequencies (when averaged over a suitable time period) may be classified as narrow-band, multi-band, or broadband, including ultra-broadband. The classification may depend on the effective fractional bandwidth of radiation. The effective fractional bandwidth, in turn, may range from parts per million to more than ten percent of the center frequency of a band of emission frequencies. The wireless emissions of the radio devices 120a, b may be modulated, i.e., may vary in frequency and/or amplitudes as a function of time. The modulation may conform to one or more communication standards.

The system 100 includes a radio imaging device 130 configured to receive the radio signals 122a, b and 124a, b generated by the radio devices 120a, b. Generally, the environment in which the system 100 operates may affect the radio signals received by the radio imaging device 120. The static and semi-static objects of the environment may affect (e.g., attenuate, diffract, and/or scatter) the wireless signals (i.e., signal-carrying radio waves) emitted by the radio devices 120a, b and received by the radio imaging device 130. The system 100 may be configured to use the effect of the static and semi-static objects on the wireless signals to generate or alter a map of the structural environment. Additionally or alternatively, the dynamic objects within the environment in which the system 100 operates may affect (e.g., attenuate, diffract, and/or scatter) the wireless signals (i.e., signal-carrying radio waves) emitted by the radio devices 120a, b and received by the radio imaging device 130. The system 100 may be configured to use the effect of objects on the wireless signals received by the radio imaging device 130 to detect, identify, and/or track the objects within the environment. In some implementations, the system 100 may include a graphical user interface (GUI) to display the map of the structural environment. The system may display on the GUI an indication of presence and/or location of one or more detected objects.

In some implementations, the radio imaging device 130 may be a part of a Wi-Fi or another wireless local area network (WLAN). For example, the radio imaging device may be an internet gateway with an integrated Wi-Fi router. Additionally or alternatively, the radio imaging device 120 may include a receiver configured to receive a wide range of frequencies, e.g., from 10 MHz to 10 GHz or another suitable portion of the spectrum, for example, with a bandwidth of more than 10% of the center wavelength.

The radio imaging device may include one or more processors to process received signals. The radio imaging device 130 may estimate a power spectrum over the received bandwidths. Variations or changes over time in the power spectrum may indicate presence and/or other properties of objects at a location.

Furthermore, the radio imaging device 130 may be configured to discern spatial variation of received signals. The radio imaging device 130 may be configured to determine variations in a signal transverse to the direction of propagation using, for example, a steerable multi-element antenna and/or using multiple-input multiple-output (MIMO) techniques. In general, the radio imaging device 130 may passively (i.e., using only receiving capabilities) discern variations in signal along one or two spatial dimensions (e.g., azimuth and elevation). Furthermore, the radio imaging device 130 may be configured to determine polarization properties of received signals. Variations or changes over time in the spatial power distribution or polarizations of received signals may indicate presence and/or other properties of objects at a location.

In some implementations, the radio imaging device 130 may discern received signal distribution with respect to some non-spatial imaging domain. For example, the radio imaging device 130 may be configured to analyze signal properties over time, over frequency, and/or over a time-frequency grid. The radio imaging device 130 may combine diversity of the receiving antenna elements with a diversity of frequencies or otherwise-defined channels to create an image over the channel-antenna space. Additionally or alternatively, the radio imaging device may vary phase distributions over antenna elements and create an image over a channel-phase space. Generally, the radio imaging device may distinguish received radio signals using any combination of the aforementioned elements, spatial or otherwise.

The radio imaging device 130 may be communicatively connected to a processing unit 135 which includes one or more processors, additionally or alternatively to the processors of the radio imaging device 130. Each processor may be a microprocessor (μP), a digital signal processor (DSP), a central processing unit (CPU), a graphical processing unit (GPU), a field-programmable gate array (FPGA), an application-specific integrated circuit (ASIC), or any other suitable electronic processing component. Additionally or alternatively, the processor unit 135 may include photonic processing components.

The processing unit 135 may include one or more computer memory devices or components, such as one or more registers, random access memory (RAM), read-only memory (ROM), electrically-erasable programmable ROM (EEPROM), or flash memory. The memory components may use magnetic, optical, electronic, spintronic, or any other suitable storage technology. In some implementations, at least some of the functionality the memory unit may be integrated in an ASIC or and FPGA. Furthermore, the memory unit may be integrated into the same chip as the processor unit.

In some implementations, the processing unit 135 may be packaged together with the radio imaging device 130. For example, when the radio imaging device 130 is included in an internet gateway, the one or more processors of the internet gateway may serve as at least a portion of the processing unit 135. Additionally or alternatively, at least a portion of the processing unit 135 may connect to the radio imaging device 130 by way of a network, such as a personal area network (PAN), a local area network (LAN), a metropolitan area network (MAN), a wide area network (WAN), etc. In some implementations, the system 100 may use, via the network, cloud computing to implement at least a portion of the processing capabilities.

Figure 4A:
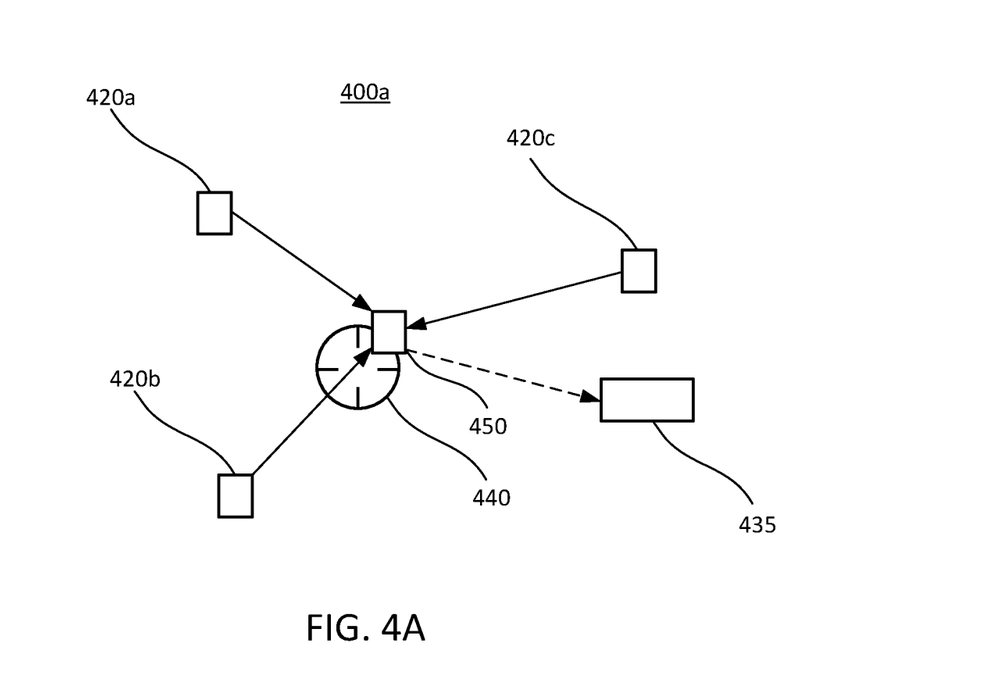
FIGS. 4A and 4B schematically illustrate radio imaging system configurations for obtaining an indication of a location of an object collocated with an active localization device.

In operation, the system 100 may use the effect of an object 140 on radio signals 122a, b at one time to detect presence and, possibly, identity and/or location of the object 140 at another time. For example, at the first time, illustrated in FIG. 1A, the object 140 may be collocated with an active localization device 150. The active localization device may be a personal computing device (e.g., a tablet, a smart phone, a smart watch, etc.). The active localization device 150 may help generate an indication of a location of the device 150 and, consequently, of the collocated object 140. Techniques for generating the indication of location using the active localization device 150 are discussed in more detail with reference to FIG. 4.

The radio imaging device 130 may receive, at the first time, the radio signals 122a, b that are scattered, reflected, and/or attenuated by the object 140 collocated with the active localization device 150. As described above, the radio imaging device 130 may obtain, for example, the signal power distributions of the received signals across spectral and spatial dimensions and communicate the obtained information to the processing unit 135. The processing unit 135 may generate, using one or more processors, a radio signature of the object 140 based on the radio signals 120a, b received by the radio imaging device 130. Furthermore, upon obtaining the indication of the location generated with the help of the active localization device 150, the processing unit 135 may associate the radio signature of the object 140 with the indicated location.

At the second time, illustrated in FIG. 1B, the object 140 is not collocated with the active localization device 150. In some scenarios, the device 150 may be turned off or otherwise unable to generate a location indication, and may therefore be referred to as an inactive device. In other scenarios, the device 150 may not be collocated with the object 140. The radio imaging device 130 may receive, at the second time, the radio signals 124a, b that are scattered, reflected, and/or attenuated by the object 140. Furthermore, the radio imaging device 130 may obtain the signal power distributions of the received signals across spectral and spatial dimensions and communicate the obtained information to the processing unit 135. The processing unit 135, based on the radio signals received at the second time (i.e., the information obtained and communicated by the radio imaging device 130) may generate a second radio signature. Based on the previously generated radio signature and the new radio signature, the computing device 135 may compute a score (e.g., a comparison score, a correlation score, a classification score, etc.) indicative of similarity between the two signatures. In a sense, the score generated by the computing device may be indicative of similarity between the received signals 122a, b and 124a, b. The score also may be indicative of a likelihood that the object 140 is at the same location or near the same location as at the first time.

After computing the score indicative of a likelihood that the object is at the location associated with a previously generated signature (e.g., the one based on the signals 122a, b received by the radio imaging device 130), the processing unit 135 may compare the score to a threshold. If the score is above the threshold, the processing unit 135 may generate a notification that the object 140 is at the same location as the one associated with the previously generated signature. The notification may be sent to a user and/or operator of the system and/or stored for future use. Security, smart home, and/or other applications may use thus generated notifications.

Multiple aspects and combinations of the signals 122a, b received by the radio imaging device 130 may contribute to the generated signature. For example, the signature may include evolution of signals over an extended time period, such as 1-1000 milliseconds for an object moving at 1-10 meters/second or, possibly, a longer time period for slower moving objects. Furthermore, multiple signals 122a, b at multiple times may contribute to the signature of an object. The signatures at different times may be averaged or combined in other ways. The various aspects of the signals 122a, b based on which the processing unit 135 may generate the signature (e.g., as described above) may include signal spectra, signal amplitudes and/or phases, powers at different channels, received signal strength indicators (RSSIs)

Figure 2:
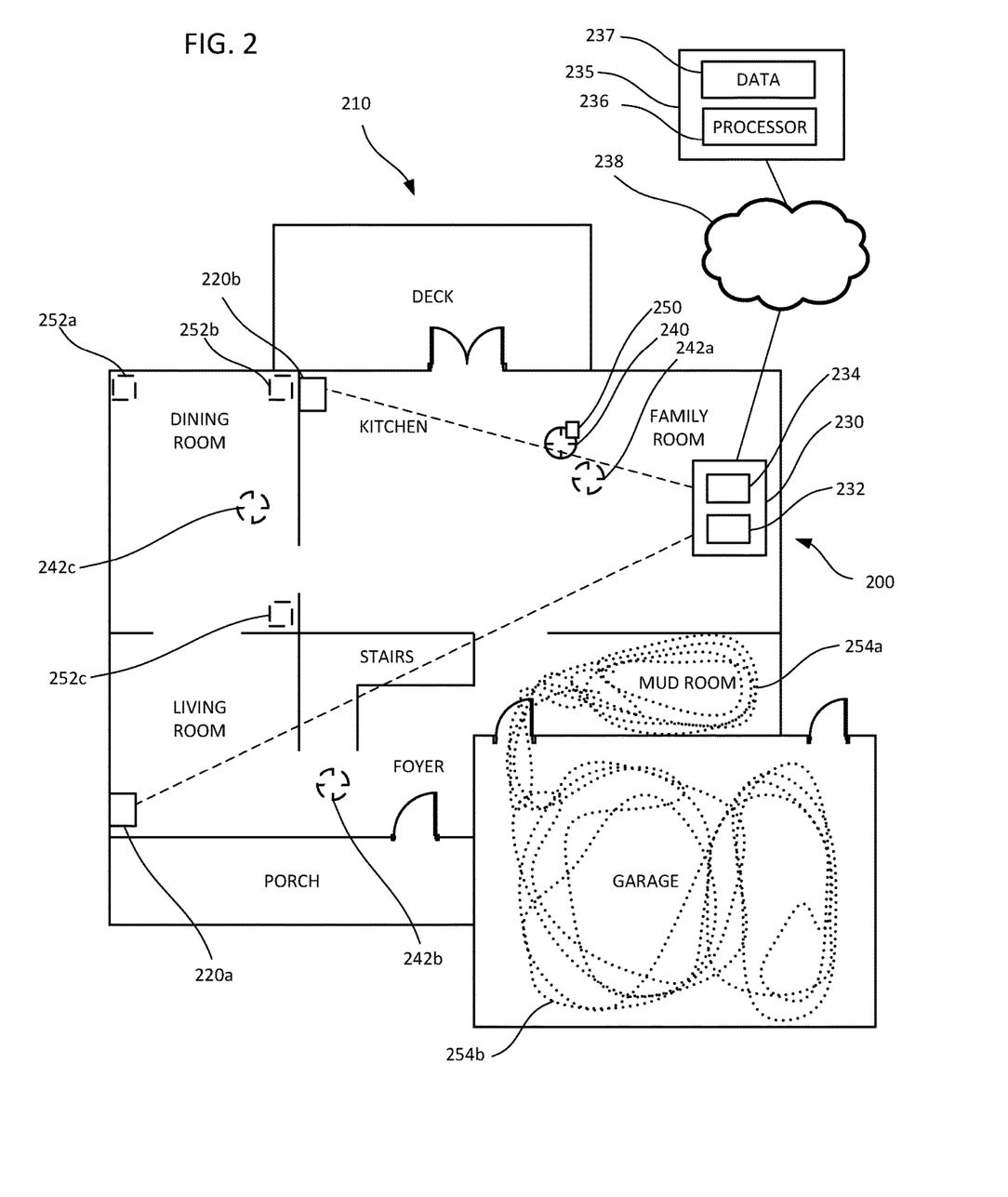
FIG. 2 illustrates an example radio-frequency imaging system operating in a structural environment.

FIG. 2 illustrates an example system 200 operating in a structural environment 210 (also referred to herein as the environment 210). The system 200 may be an example of system 100 in FIG. 1, and may be configured for radio-frequency imaging of the environment 200. In some implementations, other imaging (optical, thermal, acoustical, etc.) or sensing (magnetic, pressure, optical, angular or linear acceleration, etc.) modalities may contribute to information which the system 200 uses to enhance imaging of the environment and/or localization of objects. Additionally or alternatively, the system 200 may process input from users and/or operators either in post-processing or in real-time analysis of the environment 210 (e.g., imaging, mapping, and/or localization).

The system 200 includes radio devices 220a, b (e.g., devices 120a, b), a radio imaging device 230 (e.g., radio imaging device 130) including a controller 232 and a radio interface 234. The controller 232 may direct the radio interface 234 to receive radio signals (e.g., signals 122a, b, 124a, b) emitted by the radio devices 220a, b. In some implementations, as discussed in more detail below, the controller 234 may direct the radio interface 232 to transmit a probing radio signal and to receive the probing radio signal scattered or reflected by objects in the environment 210.

The system 200 may further include one or more processors. The one or more processors may be disposed at the controller 232 and/or at an online processing center 235. Besides a processor 236 (or a set of processors), the online processing center 235 may include data storage 237. In other implementations, data storage may be substantially removed from a processing center. The online processing center 235 may cooperate with the controller 232 to form the processing unit 135. In other implementations, the processing unit 135 may be substantially implemented in the online processing center 235, with the controller 232 running a thin client application to send and receive data from the processing center 235. In some implementations, the online processing center 235 may combine data from multiple radio imaging devices (e.g., device 230) to enhance capabilities of the system 200. For example, the system 200 may use machine learning (ML), and the online processing center 235 may aggregate data for training a machine learning model. Furthermore, one or more processors of the system 200 may be disposed at a user device, such as, for example, a smart watch, a mobile phone, a tablet, a personal computer, etc.

The online processing center 235 may be communicatively connected to the radio imaging device 230 via a network 238. The network 238 may be the Internet or another type of suitable network (e.g., a personal area network (PAN), a local area network (LAN), a metropolitan area network (MAN), a wide area network (WAN), a mobile, a wired or wireless network, a private network, a virtual private network, etc.). The network may use one or more wireless protocols, standards, or technologies for communication, such as Wi-Fi, near field communication (NFC), Bluetooth, or Bluetooth low energy (BLE). Additionally or alternatively, the network may include free-space optical or acoustic links. In some implementations, the radio imaging device 230 and/or the online computing center 235 may include one or more ports for wired communication connections. The wired connections may include electrical or optical connections (e.g., fiber-optic, twisted-pair, coaxial cable). In some implementations, the network 238 may be a LAN (e.g., a WiFi network).

Generally, the environment 210 may be an indoor environment, an outdoor environment, or a combination of indoor and outdoor environments. For example, the structural environment 210 may be a house or one floor of a house, illustrated as a floorplan in FIG. 2. The structural environment may include an outdoor area around the house, and need not have distinct borders or boundaries. In some implementations, the environment 210 may be one or more apartments, office area, shopping area, a school or at least a portion of a college campus, a hospital, a transportation station, etc.

The radio devices 220a, b may be configured to operate according to one or more wireless communications standards. For example, the radio devices 120a, b may transmit Wi-Fi, NFC, Bluetooth, BLE, ZigBee or other wireless signals. Furthermore, the wireless devices 120a, b may be configured to receive and process wireless signals corresponding to one or more wireless standards. The processing may include demodulation informational payload of the received signals. Additionally or alternatively, the processing by the radio devices 120a, b may include evaluating powers of received signals or of phases of carrier frequencies corresponding to the received signals. In some implementations, the radio devices 120a, b may contribute to generating a radio signature of an object.

At least some of the radio devices 220a, b may include multiple antenna elements. In some implementations, the radio devices 220a, b may steer the direction of transmissions using the multiple antenna elements. Additionally or alternatively, the radio devices 220a, b may use the multiple antenna elements to change direction of directional sensitivity or gain for the received signals. Furthermore, the radio devices 220a, b may be configured to perform at least a portion of processing (e.g., signal strength, carrier phase, demodulation) separately for signals received through distinct antenna elements. For example, the radio devices 120a, b may be configured for implementing a MIMO system.

The radio imaging device 230 may be configured with a variety of frequency characteristics, modulations, compliances to communication standards, signal processing capabilities, etc. For example, the radio imaging device 230 may receive Wi-Fi, NFC, Bluetooth, BLE, Zig Bee or other wireless signals. The radio imaging device 230 may also be configured to transmit radio signals. In some implementations, both radio devices 220a, b and the radio imaging device 230 may be configured to transmit and receive radio signals, to add more dimensions to the radio signature of an object.

The radio imaging device 230 may include multiple antenna elements. In some implementations, the radio devices 220a, b may use the multiple antenna elements to change direction of directional sensitivity or gain for the received signals. Additionally or alternatively, the radio imaging device 230 may steer the direction of transmissions using the multiple antenna elements. Furthermore, the radio imaging device 230 may be configured to perform at least a portion of processing (e.g., signal strength, carrier phase, demodulation) separately for signals received through distinct antenna elements. For example, the radio imaging device 230 may collaborate with the radio devices 220a, b to implement a MIMO system.

The radio devices 220a, b and the radio imaging device 230 may be disposed at separate locations throughout the environment 210. In some implementations, the system 200 may obtain information indicative of the locations of the radio devices 220a, b and the radio imaging device 230. The information indicative of the locations may include GPS coordinates (e.g., latitude, longitude, and/or elevation) and/or coordinates with respect to an arbitrary frame of reference. For example, a user or an operator may define a Cartesian or polar coordinate system with respect to the floor plan or another suitable map of the environment. The user or the operator may then communicate to the system 200 (e.g., to be stored in memory connected to the one or more processors) the locations of the radio devices 120a, b and the radio imaging device 230 with respect to the coordinate system. In other implementations, the system 100 may compute the relative positions of the radio devices 220a, b and the radio imaging device 230 based on measurements. For example, a calibration routine of the system 200 may include estimating positions of the devices 220a, b, 230. The system may further refine the position estimates during system operation. Still in other implementations, the system 200 may image the environment 210 without obtaining absolute and/or relative positions of the radio devices 220a, b, and/or the radio imaging device 230.

At a particular reference time, an object 240 (e.g., object 140) may be disposed at some location within the structural environment 210. The particular time may be referred to without the loss of generality as a first time or a reference time. At another time, the object 240 may be at another location, such as, for example, locations 242a-c. At the reference time, the object 240 may be collocated with an active localization device 250 (e.g., localization device 150). The system 200 may generated a radio signature of the object 240 and associate the radio signature with the location, based on an indication of the location that may be generated with the active localization device 250. When, at another time or new time, the object 240 is at another location (e.g., one of locations 242a-c), the system 200, via the radio imaging device 230, may receive radio signals affected by the object 240 at the new location. The system 200 may generate a temporary signature associated with the new time regardless of the presence of the collocated active localization device 250. Based on a relationship between the signature associated with the location at reference time and the temporary signature at the new time, the system 200 may compute a score indicative of a likelihood that the object location at the new time is at or near the object location at the reference time. The system 200 may compute the score based on a deterministic algorithm or based on training an ML model. The score, for example, may be an estimate of probability that the object is within a certain distance of the location at the reference time. Additionally or alternatively, the score may be indicative of a probability that the object 240 is within a defined region (e.g., kitchen, dining room, etc.) of the structural environment 210. Furthermore, the system 200 may compare the computed score to a threshold (which may be user-defined), and, if the score exceeds the threshold, the system 200 may generate a notification that the object 240 is at or near the location associated with the reference time.

The system 200 may send a notification to a user device (e.g., a personal computer, a tablet, a smart phone, a smart watch, a car head unit, etc.). The notification may be a visual notification (e.g., a message, a flashing light, a change in display luminance, etc.), an audio notification (a beep, a buzz, an audio message, etc.), and/or a haptic notification (e.g., a vibration). In some implementations, the system 200 may send the notification to another computer system that may, in response, perform an action. For example, a security system, upon receiving a notification may sound an alarm and notify a security company, a police department, medical personnel, etc.

The radio signatures of objects at different locations may include, for example, power spectra of signals received from radio devices 220a, b. The signatures may also include variation by angle of arrival (AOA) and/or variation across antenna elements of receive antennas. In some implementations, the radio signatures may include information computed in implementing a variety of radio communication protocols. In some implementations, radio signatures may include received signal strength indicators (RSSIs) and/or channel state indicators (CSIs) of Wi-Fi channels.

In some implementations, a radio signature of the object 240 associated with a location may be based on multiple reference times. In some implementations, a signature associated with an object at a location may evolve over time, as the system 200 collects more data from the same location. Additionally or alternatively, the system 200 may amalgamate radio signatures from multiple nearby locations into an aggregate signature. Furthermore, the signature may include an evolution of radio signals received over time. For example, a certain change of power and/or phase in one channel followed by another change of power and/or phase in another channel may be a signature of an object 240 moving along a certain path (e.g., moving from the living room to the dining room).

The radio imaging device 230 may receive, at different times, radio signals generated by the radio devices 220a, b and scattered, reflected, or attenuated by the object 240. The object 240 may be collocated with the active localization device 250 at a suitable number (e.g., 10, 100, 1000, etc.) of locations (e.g., locations 242a-c, etc.) at the different times.

Using the active localization device 250 and/or user input, the system 200 may obtain indications of the locations from the object 240 collocated with the active localization device 250. The system 200 may use the received radio signals and/or the indications of the locations to generate or alter a map of the structural environment 210. In some implementations, the information computed by the system 200 may be fused with data from other sensors (e.g., cameras, proximity sensors, etc.) or from graphical representation of the structural environment 210 (e.g., sketches, blueprints, etc.) to enhance the map.

In some implementations, the system 200 may build or alter the map based on data from specific locations (e.g., locations 252a-c). For example, the system 200 may include a calibration mode, during which the active localization device 252 may be located at prescribed locations. The system 200 may prompt a user to place the active localization device 250 at outer corners of the structural environment (e.g., location 252a), inner corners (e.g., 252b, c), along walls, at centers of designated areas (e.g., rooms), etc. In some implementations, a user may move an active localization device 250 along inner and/or outer walls during a calibration procedure, while the system 200 obtains position indications and/or generate radio signatures of the user associated with the positions.

Additionally or alternatively, the system 200 may generate radio signatures of an object (e.g., object 240) or multiple objects at different times and associated with a variety of unknown locations within the structural environment 210. A clustering algorithm (e.g., K-means, mean-shift, density-based, expectation-maximization, hierarchical, etc.), running on one of the processors of the system 200 (e.g., in the cloud), may cluster the radio signatures in one or more parameter spaces. For example, one parameter space may include at least some of the parameters included in a radio signature. Another parameter space may include parameters derived from the radio signatures. The derived parameter space, for example, may reduce the dimensionality of the radio signature space. One set of parameters may include the degree to which object presence affects the signature associated with each of the radio devices (e.g., devices 220a, b). For example, a weak effect on signatures associated with all of the radio devices may indicate a small object (e.g., a child, a pet, etc.). A strong effect (e.g., a measurable deviation in signature with respect to location) on signatures associated with one of the radio devices may indicate proximity to the corresponding radio device. Thus, a clustering algorithm may cluster radio signatures according to regions within the structural environment and/or according to object properties. Furthermore, the system 200 may obtain location indications at representative locations to label the clusters by region within the structural environment 210 (e.g., kitchen, porch, etc.).

The system 200 may alter or enhance the map of the structural environment using radio propagation simulation algorithms (e.g., ray tracing, finite-element method, etc.). For example, the system may use optimization algorithms to iteratively reduce the difference between a model of the structural environment 210 and the generated radio signatures. In some implementations, the system may integrate user input (e.g., regarding approximate static and semi-static object locations) and/or other sensor information (e.g., images or point-clouds from other sensors) in enhancing the map.

The system 200 may include a graphical user interface configured for visualizing the map of the structural environment 210. The graphical user interfaces may be generated on a user device (e.g., a personal computer, a tablet, a smart phone, virtual-reality headset, etc.). In some implementations, the user device may be the active localization device 250. The graphical user interface may include a graphical template representing the structural environment 210.

In generating or altering the map of the structural environment 210, the system 200 may generate a number of zones based on the locations of dynamic objects (e.g., object 240). For example, the system 200 may receive location notifications and the processors of the system may perform algorithms to identify zones. For example, the system 200 may identify zones by clusters of locations (e.g., clusters 254a, b) with sizes larger than a threshold size (e.g., 10, 20, 50, 100 m$^2$) or any other suitable size. Additionally or alternatively, the system 200 may use radio signatures, particularly the ones clustered using a clustering algorithm as described above, to identify zones. For example, radio signatures may undergo a step change with respect to position as the object 240 changes location from one room to another. The step change may be due to radio wave attenuation through a wall or another barrier separating zones. Additionally or alternatively, zones may be identified as clusters of locations and/or radio signatures with certain dynamic properties. For example, when the object 240 is in a certain zone (e.g., a kitchen), the object 240 may tend to stay in the zone for a certain period of time. More generally, statistics of paths or dynamic changes of location notifications and/or radio signatures (e.g., as described by random process parameters) may aid in identifying zones and/or objects.

Furthermore, in generating or altering the map of the structural environment 210, the system 200 may merge identified zones and/or clusters of signatures and/or locations with a graphical template (e.g., displaying zones within or over the template). The graphical template may be an architectural plan of the structural environment 210 or any other suitable graphical representation. For example, a user may sketch the graphical representation of zones (e.g., as a collection of user-defined shapes) and the system-generated plurality of zones may be merged by the system 200 with the graphical template. Generally, the graphical template need not display an accurate relative scale or a conformal representation of the structural environment 210, although the zones may be delineated and/or labeled.

The system 200 may collect radio signatures of a variety of objects. Furthermore, the system 200 may identify objects based on the corresponding radio signatures received at different times. To that end, the system 200 may receive, at certain times, indications of object identities. The system 200 may include an ML model that may be trained on a labeled set of radio signatures. Additionally or alternatively, the system 200 may use correlations with labeled radio signatures to identify objects. In some implementations, the active localization device 250 may identify the collocated object, and may add the corresponding radio signature to a training set. For example, a smart device (e.g., a smart watch, a smart phone, a smart collar, etc.) acting as the active localization device 250 may be associated with a particular user acting as the object 240. Moreover, the system 200, may associate (e.g., based on user input or a classification algorithm) a classification label with the object 240. The classification label may be generic (e.g., adult, child, pet, etc.) or specific (e.g., mom, dad, Bobby, Fido, etc.).

The system 200 may detect an unknown object based on receiving radio signals are scattered, reflected, or attenuated by the unknown object. Using previously collected radio signatures of objects and associated labels, the system 200 may identify the unknown object. For example, the system 200 may identify the unknown subject as an adult person, a child, or an animal (e.g., a pet). In some implementations or scenarios, identifying an adult, a child, or a pet may include identifying an individual. The system 200 may identify the unknown object as a potential intruder. The system 200 may identify a potential or a confirmed intruder based on the time of detection and/or the radio signature. The system 200 may generate a security alert and send the alert to a security service provider (e.g., via the network 238) and/or to a user device. Furthermore, the system 200 may display the alert via the GUI implemented by the system 200. For example, the system 200 may display the alert as a visual, audio, and/or haptic signal. Furthermore, displaying the alert in the GUI may include marking the position of the potential intruder in a zone within the map of the structural environment 210.

In some scenarios or implementations, the object 240 may be a portable device (e.g., a notebook computer, a tablet, a smart phone, etc.). At one time, the object 240 may act, simultaneously, as the active localization device 250. At another time, the object 240 may not have the active localization capability (e.g., may be turned off). Because the portable device may have a number of conductive components, the portable device may affect the radio signals regardless of the state (i.e., power on/off, localization on/off). The system 200 may generate radio signatures of the portable device associated with locations. Subsequently, the system 200 may detect presence and/or location of the portable device based on the effect of the portable device on the radio signals emitted by the radio devices 120a, b and the previously determined radio signatures. Thus, the system 200 may help locate misplaced devices even when the devices are powered off.

Figure 3:
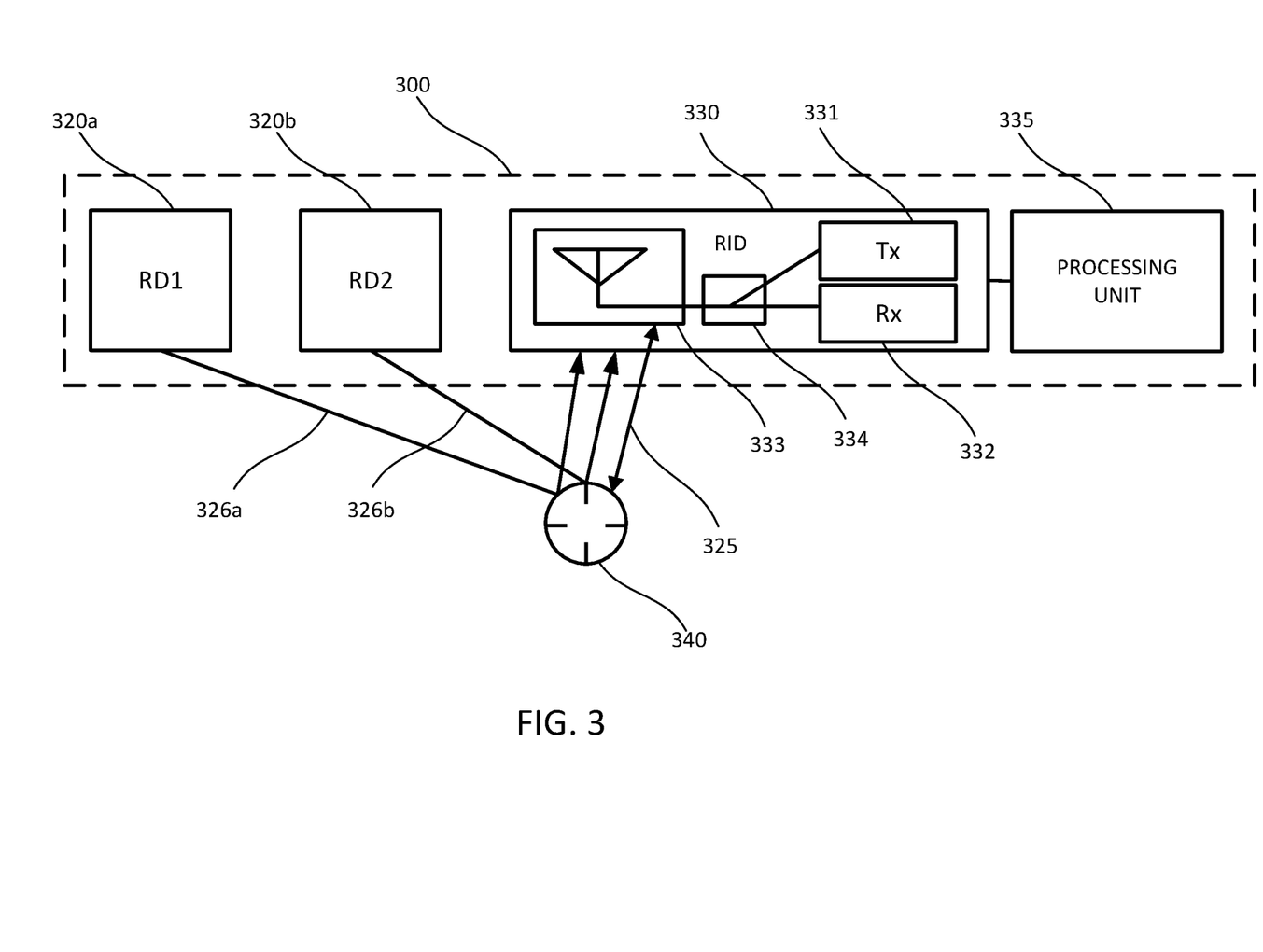
FIG. 3 schematically illustrates a radio imaging system in which a radio imaging device is configured to transmit and receive a probing radio signal.

FIG. 3 schematically illustrates a radio imaging system 300 in which a radio imaging device 330 (with components 331-334) is configured to transmit and receive a probing radio signal 325. The system 300 may be a configuration of the system 100 or the system 200, for example. The system 300 may include radio devices 320a, b, which may be the radio device 120a, b, or the radio devices 220a, b, for example. The processing unit 335 may be, as discussed above, disposed at or near the radio imaging device 330 or be connected by a network (e.g., processing center 235). Generally, the one or more processors of the system 300 may be distributed and may be configured for any combination of edge and cloud computing.

The radio imaging device 330 may include a transmitter module 331, a receiver module 332, an antenna module 333, and a transmit-receive multiplexing module 334. In some implementations, the antenna module 333 may include separate transmit and receive antennas. Furthermore, the antenna module 333 may include an antenna array configured for setting a direction of the probing signal 325. The antenna array may be a phased array in which relative phases of elements may change continuously or discretely to change the radiation pattern of the antenna array. In some implementations, the antenna module 333 may include separate antennas for transmit and receive paths. Alternatively, the system 300 may use the same antenna for transmitting and receiving the probing radio signal 325.

The multiplexing module 334 is configured to route radio signals along transmit and receive paths. In some implementations, the multiplexing module 334 may include a switch. The switch may connect the transmitter module 331 to the antenna module 333 at one time, and the receiver module 332 to the antenna module 333 at another time. The switch may have a switching time of 0.1, 0.2, 0.5, 1, 2, 5, 10 ns or another suitable switching speed. In other implementations, the multiplexing module 334 may include a circulator.

In some implementations, the radio signal 325 generated by the transmitter module 331 may include one or more pulses, each with a duration of 0.1, 0.2, 0.5, 1, 2, 5, 10 ns or another suitable time. The receiver module 332 may receive the radio signal 325 scattered by an object 340, and the imaging device 330 may determine a time of flight (TOF) associated with the scattered pulse and compute distance to the object 340 based on the TOF. In other implementations, the radio signal 325 may be a wide band or an ultra-wide broadband signal and/or the imaging device 330 may use the receiver module 332 to determine a difference in phases of the received signal 325 at different frequencies across the signal spectrum. Furthermore, the imaging module 330 may use multiple-input multiple-output (MIMO) configuration to reject reflections from static objects to enhance the signal from the object 340 that is moving.

Figure 4B:
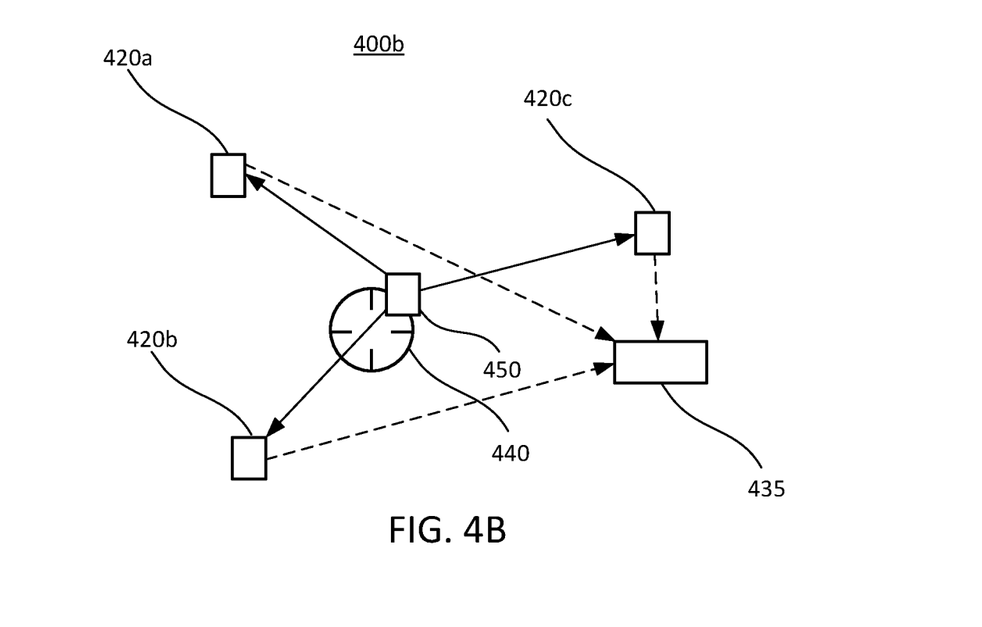

FIGS. 4A and 4B schematically illustrate radio imaging system configurations 400a, b, (e.g., of systems 100, 200, or 300) particularly with respect to radio devices 420a-c, for obtaining at a processing unit 435 an indication of a location of an object 440 collocated with an active localization device 450. Generally, the active localization device 450 may use any suitable combination of techniques for obtaining the indication of location only some of which use the radio devices 420a-c.

In configuration 400a, the active localization device 450 may receive localization signals from the radio devices 420a-c, compute the indication of location, and send the indication of location to the processing unit 435. The localization device 450 may compute the indication of location based on TOF or phase information of spectral components of the signals from the radio devices 420a-c. In some implementations, the localization signals from the radio devices 420a-c may include frequency-modulated signals, and the localization device 450 may compute the indication of location based on frequency shifts of the received localization signals. The radio devices 420a-c may use a common time reference, such as global positioning system (GPS) time or network time to synchronize their emissions. Additionally or alternatively, the radio devices 420a-c may emit the localization signals in response to receiving a trigger signal from the active localization device 450. The localization device may use round-trip TOF measured with respect to the trigger signal to compute the indication of location.

In configuration 400b, the active localization device 450 may send localization signals to the radio devices 420a-c. In turn, the radio devices 420a-c may send data regarding the localization signal properties to the processing unit 435. The data regarding the localization signal properties may include differential TOF data, phase data, and/or frequency data.

In some implementations, the radio imaging system may use round-trip delays from localization signals emitted by and returning to the localization device 450 or emitted by and returning to the radio devices 420a-c. In one implementation, radio devices 420a-c may receive signals from the localization device 450 and send a return localization signal. The localization device may process the return localization signals to compute round-trip TOF or differential round-trip TOF. In another implementation, the localization device 450 may receive the signals and, subsequently, send signal to the radio devices 420a-c. In some implementations, absolute or differential round trip delay times may be computed using correlations of transmitted and received signals.

The radio devices 420a-c may be configured with beamforming capabilities, and the system may use triangulation to determine the location of the localization device 450 and the collocated object 440. In configuration 400a, the radio device may sweep the angles of transmissions to determine the direction of localization device 450 with respect to each of the radio devices 420a-c. In configuration 400b, the system may vary the angles of reception of each of the radio devices 420a-c to determine the direction of localization device 450 with respect to each of the radio devices 420a-c.

In other implementations or scenarios, the active localization device 450 may determine the indication of location using global positioning system (GPS) or enhanced GPS (via, for example, cellular towers) signals. Still in other implementations or scenarios, the active localization device 450 may render a graphical representation of a structural environment and a user may indicate on the localization device the location for associating with a radio signature. Furthermore, user-labeled locations may help train an ML model for automatic determination of locations based on signatures.

Figure 5:
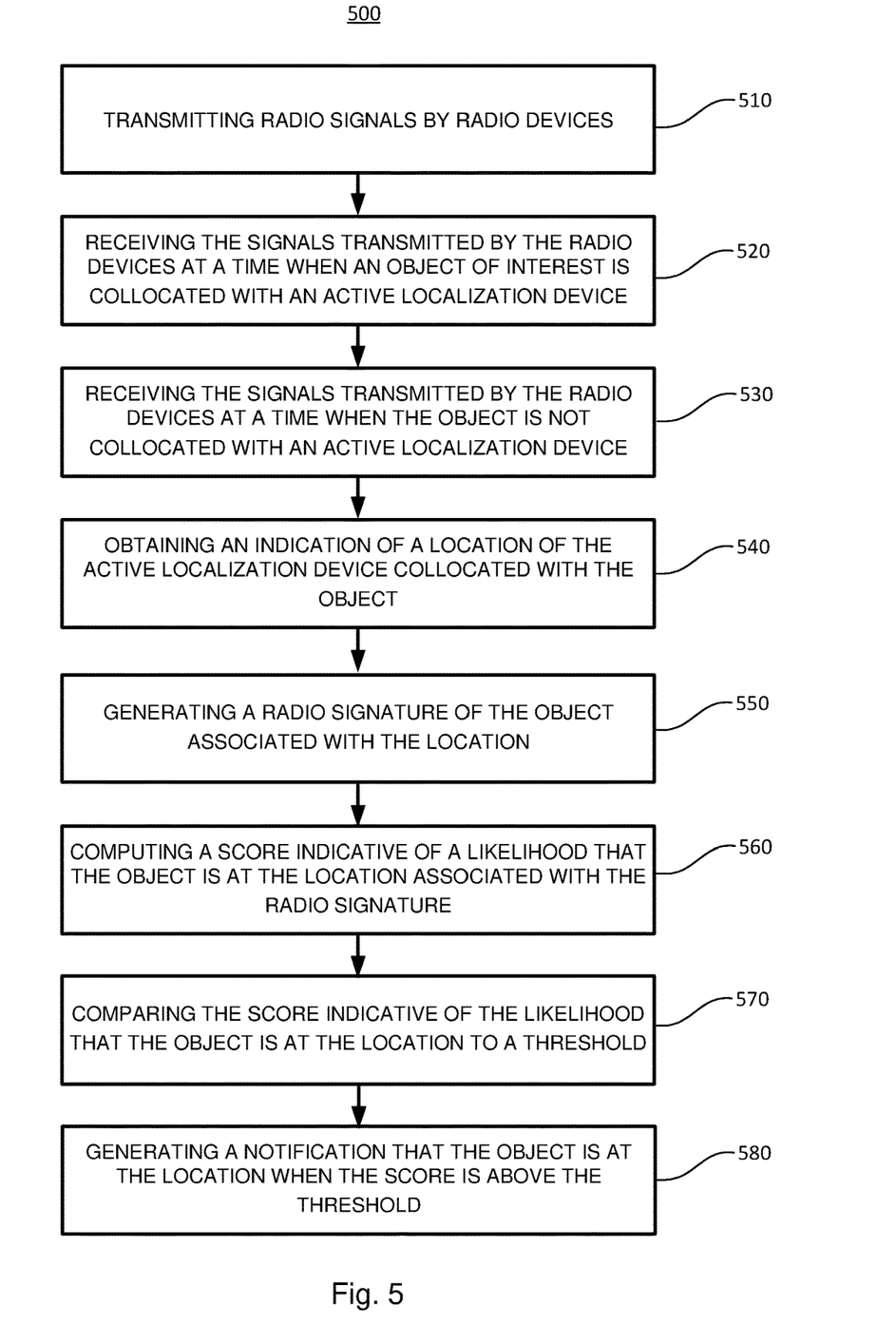
FIG. 5 is a block diagram of an example method for radio-frequency imaging of a structural environment.

FIG. 5 is a block diagram of an example method 500 for radio-frequency imaging of a structural environment. The method may be implemented using a radio-frequency imaging system (e.g., system 100). The system, in some implementations, may implement only a subset of the blocks of the method 500 and/or additional blocks.

At block 510, the method 500 includes transmitting radio signals by one or more radio devices (e.g., radio devices 120a, b). The radio devices may be communication devices, security devices, etc. operating in accordance with one or more of a variety of communication standards, as described above.

At block 520, the method 500 includes receiving the radio signals transmitted by the radio devices at a time when an object of interest is collocated with an active localization device. The object may be static (e.g., walls, floors, ceilings, etc.), semi-static (e.g., furniture, doors, etc.), or dynamic (e.g., people, animals). A radio imaging device may receive the radio signals that are scattered, reflected, or attenuated by the object collocated with the active localization device. These signals may serve as reference signals indicative of the object or, more specifically, of the object at a location within the environment. In some implementations, the radio imaging device may receive signals during a time interval (e.g., 0.1, 0.2, 0.5, 1, 2, 5, 10 seconds) and generate a time series of received signals.

In some implementations and/or scenarios, the method may include a calibration or another process, during which a user may need to position the active localization device at a number or locations associated with static objects. A cardinal set of such locations may include corners, walls, doorways, etc.

At block 530, the method 500 includes receiving the radio signals transmitted by the radio devices at another time, for example, when the object is not collocated with the active localization device. The radio imaging device may receive signals scattered, reflected, or attenuated by the object. In some implementations, the radio imaging device may receive signals during a time interval (e.g., 0.1, 0.2, 0.5, 1, 2, 5, 10 seconds) and generate a time series of received signals.

At block 540 the method 500 includes obtaining an indication of a location of the active localization device at the first time. For example, a processing unit may obtain the indication from one of the radio devices, the radio imaging device, and/or the active localization device. In some implementations, a user may indicate the location via a user interface. In another implementation, the system may prompt a user to place the active localization device at a specified location and/or position an object at a specified location. For example, the system may ask a user to walk around in a certain zone of a structural environment, or to take a path through the structural environment. The system may then collect the reference radio signals during the changing position of the user.

In some implementations, the indication of location may correspond to a location within a certain coordinate system. The coordinate system may map onto the structural environment. In another implementation, the indication of location may indicate a zone within the structural environment. The zones need not be in a known spatial relationship with each other. Any suitable number of zones (e.g., 2, 5, 10, 20, 50, 100, etc.) may be associated with the structural environment. In some implementations, the system may determine the zones by clustering locations based on similarities in radio signals and/or time proximity of radio signals. That is, similar object-altered signals and/or object-altered signals close in time may be clustered into the same zone. In other implementations, a user may send a zone notification as an indication of position. For example, a user may identify a set of zones, and cause an object to move (e.g., the user, another person, etc.) through the set of zones as the system generates or alters corresponding radio signatures.

In some implementation, the method 500 may include using indications of locations of objects at different locations to generate and/or refine a map of the structural environment. Generating and/or refining the map may include clustering locations, using user input, and/or other techniques described above.

At block 550, the method 500 includes generating a radio signature of the object associated with the location. The processing unit may generate the radio signature based on the radio signals received at the time when the object was at the determined location (e.g., collocated with the active localization device) and the indication of the location. For example, the system may collect multiple sets of radio signal data when an object is in the vicinity of a location and extract common features or amalgamate the data in another manner (e.g., averaging, nonlinear filtering) to generate the radio signature.

In some implementations, the method 500 may include altering a previously generated signature. For example, the processing unit may generate an early estimate of a signature based on a set of received radio signals, but update the signature as more data is collected. Furthermore, changing or altering a set of signatures may be based on a triggering event. The triggering event may be, for example, a change in the structural environment, change in configuration of the radio devices, detection of radio interference due to spurious radio sources and/or natural phenomena (e.g., sun spots, geomagnetic storms, ionospheric turbulence, etc.).

At block 560, the method 500 includes computing a score indicative of a likelihood that the object is at the location associated with the radio signature. The processing unit may compute the score based on the received radio signals at the time when the object is not collocated with the active localization device and the generated radio signature. In some implementations, the system may compute likelihood scores for a plurality of locations (e.g., a score for every zone). The system may, for example, match a radio signature to a zone using a classification algorithm. Specifically, the classification may use a machine learning algorithm such as clustering or a neural net. In other applications, the system may compute a distance measure between signatures to generate the score.

At block 570, the method 500 includes comparing the score to a threshold. For example, the processing unit may compare the score to the threshold previously set by a user or operator and stored at the processing unit. In some implementations, a threshold may depend on location and/or on the object.

At block 580, the method 500 includes generating, by the one or more processors, a notification that the object is at the location when the score is above the threshold. In some implementations, the method 500 may include rendering the map of the environment on a graphical user interface and display, with a suitable visual indicator, the notification that the object is at the location on the map.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein.

To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

What is claimed is:

1. A system for radio-frequency imaging of a structural environment, the system comprising:
   one or more radio devices, located at one or more first locations and configured to transmit radio signals;
   a radio imaging device, located at a second location different from the one or more first locations, and configured to:
      receive, at a first time, first radio signals transmitted by the one or more radio devices, wherein the first radio signals received by the radio imaging device at the first time are scattered, reflected, or attenuated by an object, and the object is collocated with an active localization device; and receive, at a second time, second radio signals transmitted by the one or more radio devices, wherein the second radio signals received by the radio imaging device at the second time are scattered, reflected, or attenuated by the object, and the object is not collocated with the active localization device; and one or more processors, configured to:

obtain an indication of a third location of the active localization device at the first time, the third location being different from the second location;

based on the first radio signals received by the radio imaging device at the first time and the indication of the third location, generate a radio signature for the object associated with the third location;

based on the second radio signals received by the radio imaging device at the second time and the radio signature generated by the radio imaging device, compute a score indicative of a likelihood that the object is at the third location at the second time, wherein the score is a comparison score indicative of a similarity between the second radio signals received by the radio imaging device at the second time and the radio signature generated by the radio imaging device;

compare the score to a threshold; and generate a notification that the object is at the third location when the score is above the threshold.

2. The system of claim 1, wherein:

the radio imaging device is further configured to receive, at a plurality of times, radio signals transmitted by the one or more radio devices and scattered, reflected, or attenuated by one or more objects collocated with the localization device at a plurality of locations; and the one or more processors are further configured to:
obtain indications of the plurality of locations; and
generate or alter a map of the structural environment at least in part based on the radio signals received at the plurality of times and the indications of the plurality of locations.

3. The system of claim 2, further comprising a graphical user interface configured for visualizing the map of the structural environment, and wherein:

generating or altering the map of the structural environments includes:
generating a plurality of zones based at least in part on the indications of the plurality of locations; and
merging the plurality of zones with a graphical template.

4. The system of claim 1, wherein:

the radio imaging device is further configured to receive, at a third time, third radio signals transmitted by the one or more radio devices and scattered, reflected, or attenuated by an unknown object; and the one or more processors are further configured to identify the unknown object as an adult person, a child, or an animal.

5. The system of claim 4, wherein the one or more processors are configured to: identify the unknown object as a potential intruder and generate a security alert.

6. The system of claim 1, wherein the object is a personal computing device.

7. The system of claim 1, wherein the radio signals transmitted by the one or more radio devices conform to a standard that belongs to the IEEE 802.11 family of standards.

8. The system of claim 7, wherein the radio signature for the object associated with the third location includes at least one channel state indicator (CSI).

9. The system of claim 1, wherein:

the radio imaging device is further configured to:
transmit a probing radio signal; and
receive the probing radio signal scattered or reflected by the object at the second time; and the one or more processors are configured to compute the score indicative of the likelihood that the object is at the third location at least in part based on the probing radio signal received at the second time.

10. The system of claim 9, wherein:

the radio imaging device further includes a steerable antenna configured for setting a direction of the probing radio signal; and the one or more processors are configured to compute the score indicative of the likelihood that the object is at the third location at least in part based on the direction of the probing radio signal.

11. A method for radio-frequency imaging of a structural environment, the method comprising:

transmitting, by one or more radio devices located at one or more first locations, radio signals;

receiving, by a radio imaging device located at a second location at a first time, first radio signals transmitted by the one or more radio devices, wherein the first radio signals received by the radio imaging device at the first time are scattered, reflected, or attenuated by an object, and the object is collocated with an active localization device;

receiving, by the radio imaging device at a second time, second radio signals transmitted by the one or more radio devices, wherein the second radio signals received by the radio imaging device at the second time are scattered, reflected, or attenuated by the object, and the object is not collocated with the active localization device;

obtaining, by one or more processors, an indication of a third location of the active localization device at the first time;

generating, by the one or more processors, a radio signature for the object associated with the third location based on the first radio signals received at the first time and the indication of the third location;

computing, by the one or more processors, a score indicative of a likelihood that the object is at the third location at the second time based on the second radio signals received by the radio imaging device at the second time and the radio signature generated by the radio imaging device, wherein the score is a comparison score indicative of a similarity between the second radio signals received by the radio imaging device at the second time and the radio signature generated by the radio imaging device;

comparing, by the one or more processors, the score to a threshold; and generating, by the one or more processors, a notification that the object is at the third location when the score is above the threshold.

12. The method of claim 11, further comprising:

receiving, by the radio imaging device, at a plurality of times, radio signals transmitted by the one or more radio devices and scattered, reflected, or attenuated by one or more objects collocated with the localization device at a plurality of locations;

obtaining, by the one or more processors, indications of the plurality of locations; and generating or altering, by the one or more processors, a map of the structural environment at least in part based on the radio signals received at the plurality of times and the indications of the plurality of locations.

13. The method of claim 12, further comprising:

displaying, by a graphical user interface, the map of the structural environment, wherein generating or altering the map of the structural environments includes:
generating a plurality of zones based at least in part on the indications of the plurality of locations; and
merging the plurality of zones with a graphical template.

14. The method of claim 11, further comprising:

receiving, by the radio imaging device at a third time, third radio signals transmitted by the one or more radio devices and scattered, reflected, or attenuated by an unknown object; and identifying, by the one or more processors, the unknown object as an adult person, a child, or an animal.

15. The method of claim 14, further comprising:

identifying, by the one or more processors, the unknown object as a potential intruder, and generating, by the one or more processors a security alert.

16. The method of claim 11, further comprising:

transmitting, by the radio imaging device, a probing radio signal; and receiving, by the radio imaging device, the probing radio signal scattered or reflected by the object at the second time, wherein computing the score indicative of the likelihood that the object is at the third location is at least in part based on the probing radio signal received at the second time.

17. The method of claim 16, further comprising:

setting a direction of the probing radio signal by a steerable antenna of the radio imaging device, wherein computing the score indicative of the likelihood that the object is at the third location is at least in part based on the direction of the probing radio signal.

18. A tangible, non-transitory computer-readable medium storing executable instructions for radio-frequency imaging of a structural environment that, when executed by at least one processor of a computer system, cause the computer system to:

transmit radio signals by one or more radio devices located at one or more first locations;

receive, by a radio imaging device located at a second location at a first time, first radio signals transmitted by the one or more radio devices, wherein the first radio signals received by the radio imaging device at the first time are scattered, reflected, or attenuated by an object, and the object is collocated with an active localization device;

receive, by a radio imaging device located at a second location at a second time, second radio signals transmitted by the one or more radio devices, wherein the second radio signals received by the radio imaging device at the second time are scattered, reflected, or attenuated by the object, and the object is not collocated with the active localization device;

obtain an indication of a third location of the active localization device at the first time;

generate a radio signature for the object associated with the third location based on the first radio signals received by the radio imaging device at the first time and the indication of the third location;

compute a score indicative of a likelihood that the object is at the third location at the second time based on the second radio signals received by the radio imaging device at the second time and the radio signature generated by the radio imaging device, wherein the score is a comparison score indicative of a similarity between the second radio signals received by the radio imaging device at the second time and the radio signature generated by the radio imaging device;

compare the score to a threshold; and generate a notification that the object is at the third location when the score is above the threshold.

19. The tangible, non-transitory computer-readable medium of claim 18, wherein the executable instructions further cause the computer system to:

receive, at a plurality of times by the radio imaging device, radio signals transmitted by the one or more radio devices and scattered, reflected, or attenuated by one or more objects collocated with the localization device at a plurality of locations;

obtain indications of the plurality of locations; and generate or alter a map of the structural environment at least in part based on the radio signals received at the plurality of times and the indications of the plurality of locations.

20. The tangible, non-transitory computer-readable medium of claim 18, wherein the executable instructions further cause the computer system to:

transmit a probing radio signal by the radio imaging device; and receive the probing radio signal scattered or reflected by the object at the second time by the radio imaging device; and computer the score indicative of the likelihood that the object is at the third location based in part on the probing radio signal received at the second time.

* * * * *